UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

PLASTIC COMPOSITION, ARTICLE MADE FROM SAME, AND PROCESS OF MAKING.

1,175,427.     Specification of Letters Patent.     Patented Mar. 14, 1916.

No Drawing.     Application filed November 25, 1913. Serial No. 803,049.

*To all whom it may concern:*

Be it known that I, WALTER K. FREEMAN, a citizen of the United States, residing at Oscawana, in the county of Westchester and State of New York, have invented certain new and useful Improvements in Plastic Compositions, Articles Made from Same, and Processes of Making; and I do hereby declare the following to be a full, clear, and exact description of the invention, such as will enable others skilled in the art to make and use the same.

My invention relates to a new composition of matter and the method of making the same.

The object of my invention is to produce a highly satisfactory fire-proof and moisture-proof article in the form of boards, strips and other shapes, which may be cheaply constructed; and to this end, I utilize the wood derivatives recovered from the sulfite waste liquor of wood pulp mills. I have found that such articles can be cheaply made and possess a number of highly valuable characteristics which make them exceedingly valuable for various uses. Boards made in accordance with my invention have a suitable degree of tenacity and elasticity and are substantially fire-proof and moisture-proof and will take a nail without danger of splitting, and as readily as soft wood. Composition boards and like articles made in accordance with my invention may be used in fire-proof or other structures where similar articles of wood are now used, and will be found to be better suited for many of such uses than similar articles of wood.

In my co-pending application, Serial Number 803,043, filed on even date herewith, I have described a method of recovering from the sulfite waste liquor of wood pulp mills, the wood derivatives and also the sulfurous acid and calcium constituents in the form of substantially neutral inert substances, and I have used the word "xylium" to designate broadly the substantially neutralized inert recovered product whether in a syrupy or anhydrous state. It was pointed out in that application that if the wood derivatives were to be recovered and separated from the sulfurous acid and calcium constituents of the liquor, the liquor was first neutralized and then treated with a suitable precipitant agent as barium chlorid to effect precipitation of the sulfur and calcium compounds of the liquor, after which the syrupy mass containing the wood derivatives of the liquor was drawn off from the precipitate and then bleached if desired, and evaporated down to an anhydrous mass and ground into powder. I termed this recovered substance containing the wood derivatives separated from the precipitates, whether in the syrupy or powdered state, "xylozo." It was also pointed out that if the wood derivatives and neutralized sulfurous acid and calcium ingredients were to remain unseparated in the neutralized mixture, the mixture could be treated so as to effect precipitation of the sulfur calcium compounds, or it could be treated in such a way as to simply convert such compounds into inert substances suspended through the mass, as may be desired; and I termed this resulting mixture, whether in the syrupy or anhydrous state, "xylosca."

In this specification, I will use the terms "xylium," "xylosca" and "xylozo" in the sense stated, to designate the neutralized products recovered from the sulfite waste liquor.

In order that those skilled in the art may thoroughly understand my invention and the manner of carrying out the same, I will describe in detail what I believe to be the best method of forming my new composition board or like article.

I first take a quantity of suitable disintegrated fibrous material, such as disintegrated corn stalks, cotton-seed husks, hard flax fiber, straw, wood or other suitable fibrous material, and wet it preferably to the point of saturation, with a solution of a suitable metallic chlorid. I prefer, for this purpose, to use magnesium chlorid on account of its cheapness and color, and in practice I have found that a solution of magnesium chlorid 15° Baumé gives very satisfactory results. I then add a suitable quantity of powdered metallic oxid to the saturated fibrous material and mix it in uniformly so that the material is thoroughly coated.

Sufficient oxid should be added to insure the proper chemical action to harden the fibrous material. To the mixture is added a suitable quantity of any of these materials, according to the character of the article desired, and a suitable quantity of an oxy-chlorid bond, and this mixture in a plastic condition is then passed between suitable hot surfaces to press the fibers of the mixture together, dispel the excess moisture and produce a uniform thickness of material of suitable shape with a smooth surface. In practice I prefer to mix the treated fibrous material while in a moist state, with the dry "xylium" and the dry oxid powder and then moisten the mixture to a plastic state with a suitable chlorid solution of sufficient strength to bring about the bonding action of the oxy-chlorid, and preferably about 25° Baumé. This method of treatment eliminates the necessary expense and time taken in preparing the chlorid element in a dry state, as is well understood, and which is necessary where the chlorid of the metal is to be added in the form of a dry powder. If, however, the mixture is to be prepared away from the place of manufacture of the ingredients and without facilities of preparing the same, then the chlorid element will be shipped in the prepared dry powdered state, in which case the fibrous material may be mixed with the powdered sulfite liquor product and the dry metal oxid and chlorid separately or in one operation, after which the mixture may be moistened to a plastic mass with water or a very weak solution of the metal chlorid, and passed between hot surfaces, as above described.

I prefer to treat the fibrous material with the oxy-chlorid of the same metal with which the sulfite liquor product is mixed, but, if desired, compound oxy-chlorids of different metals may be used.

The percentage of ingredients of the mixture may vary widely, according to the character of the composition article desired, but I have found in practice that the following proportions of ingredients make a highly satisfactory board to be used as plasterboard to take the place of the well known plasterboards of commerce made of plaster of Paris:—30 parts by weight of "xylosca" or "xylozo," a substantially equal part by weight of a suitable dry metal oxid, such as megnesium oxid, substantially half as much of the dry chlorid of the metal by weight as the oxid, and substantially one and one-half times as much of the total mixture by weight of suitable dry disintegrated fibrous material, such as disintegrated corn stalks or cotton-seed husks, which is treated with a solution of magnesium chlorid about 15° Baumé and then mixed with enough magnesium oxid to coat it. To these ingredients, insert matter such as marble dust or clean sand may be added, if desired, in the amount of 10 to 200 parts, but the addition of such inert matter tends to weaken and lessen the tensile strength and increase the weight of the resulting article, and should only be used where a cheaper and inferior article is desired.

I have described with particularity the best method of carrying out my invention because this method insures a more thorough hardening of the fibrous ingredients and a more thorough intermixing of the same with the "xylium" and the oxy-chlorid cement, resulting in the subsequent uniform bonding of the ingredients and a more homogeneous structure than can be obtained by any other method now known to me, all of which add strength and durability to the resulting article and increase the fire-proof and moisture-proof quality of the same; but after this disclosure of my invention, it will be obvious to those skilled in the art that certain changes may be made in the method of carrying out the same, without departing from the broad scope thereof. For instance, it is immaterial to my broad invention of the resulting composition of matter in what exact manner the different ingredients are added in forming the plastic mixture.

Having thus described my invention, what I claim as new and desire to secure by Letters Patent, is:

1. The method of making composition articles, which consists in mixing powdered "xylium" with a powdered metallic oxid capable of induration and disintegrated fibrous material, moistening said mixture with a solution of chlorid responsive to the said oxid and mixing to form a plastic mass, and then passing said mass between hot surfaces to press it into shape.

2. The method of making a new composition article, which consists in forming a mixture containing "xylium," an oxy-chlorid bond, and fibrous material which has been moistened with a suitable metallic chlorid, and passing said mixture in a plastic state between hot surfaces to press it together and form it into shape.

3. The method of making composition articles, which consists in mixing powdered "xylium" with powdered magnesium oxid and disintegrated fibrous material, moistening said mixture with a solution containing magnesium chlorid to form a plastic mass, the chlorid being in sufficient quantity to form an oxy-chlorid bond, and bringing said mass into contact with hot surfaces to shape the same and free it of excess moisture.

4. The method of making composition articles, which consists in forming a mixture containing "xylium," a powdered metallic oxid, suitable vegetable material and an oxychlorid, and then wetting the mixture with a chlorid solution and running the same between hot surfaces to press it into form and remove excess moisture.

5. The method of making composition articles which consists in coating with a metallic oxid capable of induration fibrous material which has been treated with "xylium" and a similar powdered metallic oxid, moistening the mixture with a solution of the chlorid of a metal responsive to the said oxid, and running the mixture between hot surfaces to remove excess moisture and press into form.

6. The method of making composition articles, which consists in mixing with powdered "xylium," a powdered metallic oxid capable of induration, fibrous material which has been treated with a solution of a metallic chlorid and with powdered metal oxid, and then wetting the mixture with a solution of the chlorid of a metal responsive to the said oxid and passing the mixture between hot surfaces to press it into form.

7. The method of making composition articles as boards and the like, which consists in treating dry disintegrated fibrous material with a solution of a metallic chlorid capable of effecting induration, then mixing with powdered oxid of the metal, then mixing said fibrous material with powdered "xylium" and a suitable powdered metallic oxid, wetting the mixture with a solution of the chlorid of the metal, and passing the mixture between hot surfaces to press it into form and remove excess moisture.

8. The method of making composition articles as boards and the like, which consists in treating dry disintegrated fibrous material with a solution of a metallic chlorid capable of effecting induration, then mixing with powdered oxid of the metal, mixing powdered "xylium" with a suitable powdered metallic oxid, and then mixing said treated fibrous material with the powdered mixture while moist, wetting the mixture to the consistency of a plastic mass with a solution of a metallic chlorid capable of effecting induration and bringing the plastic mass into contact with hot surfaces to press it into form.

9. The method of making composition articles as boards and the like, which consists in coating with powdered magnesium oxid fibrous material which has been treated with magnesium chlorid, mixing the fibrous material while moist, with powdered "xylium" and powdered magnesium oxid, moistening the mixture with a solution of magnesium chlorid of approximately 15° Baumé of strength to form a plastic mass, and then running the mass between hot surfaces to press it into form.

10. The method of making composition articles as boards and the like, which consists in treating dry disintegrated fibrous material with a solution of magnesium chlorid, then mixing with powdered magnesium oxid, then mixing said fibrous material while moist with powdered "xylium" and magnesium oxid, moistening the mixture with magnesium chlorid and passing the mixture between hot rollers to eliminate excess moisture and press it into form.

11. The method of making composition articles as boards and the like, which consists in treating dry disintegrated fibrous material with a solution of a metallic chlorid, then mixing with powdered oxid of the metal to harden said material, then mixing the resulting material with powdered "xylium" and a powdered metallic oxid capable of effecting induration, moistening the mixture with a solution of the chlorid of the metal to form a plastic mass of said mixture, and passing the same between hot surfaces to press into form and eliminate excess moisture.

12. The method of making composition articles, which consists in forming a mixture containing "xylium," fibrous material and the components of an oxy-chlorid bond, and then wetting the mixture and passing the same between hot surfaces to press it into form.

13. The method of making composition articles, which consists in mixing with "xylium" and a suitable powdered oxychlorid cement, dry vegetable material which has been treated with a suitable oxychlorid and then wetting the mixture with water and passing it between hot surfaces to exclude moisture and press it into form.

14. A new composition of matter containing intimately mixed a substantial portion of powdered "xylium," disintegrated fibrous material, and the components of an indurating oxy-chlorid bond.

15. A new composition of matter containing a substantial proportion of "xylium," hardened disintegrated fibrous material and an indurating oxy-chlorid cement.

16. A new composition article made by treating fibrous material with an indurating oxy-chlorid element to harden the same, mixing the resulting prcduct while moist, "xylium" and the components of a powdered oxy-chlorid bond, and passing the mixture in a plastic state between hot surfaces.

17. A new composition board made by moistening suitable fibrous material with a solution of a metallic chlorid, then mixing therewith a responsive powdered oxid of the metal to harden said fibrous material, then mixing said material while moist with powdered "xylium" and a suitable powdered metallic oxid, moistening the mixture to a plastic mass with a solution of the chlorid of the metal and passing the same between hot rollers to eliminate excess moisture and press into form.

In testimony whereof I affix my signature, in the presence of two subscribing witnesses.

WALTER K. FREEMAN.

Witnesses:
 JNO. S. GEORGE,
 CLARENCE W. HODGE.